United States Patent [19]

Murcheson

[11] Patent Number: 5,058,914
[45] Date of Patent: Oct. 22, 1991

[54] FIFTH WHEEL SLIP COVER

[76] Inventor: Gordon S. Murcheson, 613 6th St., Nanaimo, British Columbia, Canada, V9R 1J7

[21] Appl. No.: 621,302

[22] Filed: Nov. 30, 1990

[51] Int. Cl.⁵ .......................... B62D 53/08; B60J 7/10
[52] U.S. Cl. .................................. 280/433; 280/507; 150/166
[58] Field of Search .................. 280/408, 416.1, 416.2, 280/418.1, 432–434, 438.1, 476.1, 901, DIG. 14, 507; 150/154, 165, 166, 167; D6/610, 611; D8/346; D9/444–445

[56] References Cited

U.S. PATENT DOCUMENTS

| | | |
|---|---|---|
| 3,704,924 | 12/1972 | Lowry . |
| 3,924,909 | 12/1975 | Kent et al. . |
| 4,542,912 | 9/1985 | St. Louis . |
| 4,752,081 | 6/1988 | Reeners et al. . |
| 4,832,359 | 5/1989 | Rafi-Zadeh . |
| 4,955,968 | 9/1990 | Beckerer, Jr. ................. 150/166 X |

FOREIGN PATENT DOCUMENTS 0075363  7/1949  Norway ............................. 150/166

Primary Examiner—Kenneth R. Rice
Assistant Examiner—Victor E. Johnson
Attorney, Agent, or Firm—Barrigar & Oyen

[57] ABSTRACT

A releasable slip cover for covering a tractor bearing plate to protect the bearing plate from abrasive residue when the tractor is driven detached from the trailer.

8 Claims, 1 Drawing Sheet

FIFTH WHEEL SLIP COVER

FIELD OF THE INVENTION

This application pertains to a slip cover releasably fastenable to a tractor fifth wheel bearing plate for protecting the bearing plate from abrasive residue when the tractor is driven with the trailer detached.

BACKGROUND OF THE INVENTION

Fifth wheel assemblies for releasably coupling tractors to trailers are well known. Each fifth wheel assembly includes two bearing surfaces; namely, a tractor bearing plate pivotally mounted on the upper rear portion of the tractor, and a trailer bearing plate or bolster plate mounted on the undersurface of the forward portion of the trailer. The tractor bearing plate supports the weight of the trailer resting against it and acts as a surface against which the bolster plate of the trailer rotates as necessary during towing operations. The tractor bearing plate must be suitably lubricated in order to enable the bearing surfaces to safely rotate relative to each other when the wheels of the tractor are turned.

Various tractor bearing plate attachments have been proposed in the past which are designed to obviate the need to repeatedly apply lubricant to the engaged bearing surfaces. For example, U.S. Pat. No. 4,542,912 granted to St. Louis on Sept. 24, 1985 discloses a bearing attachment consisting of an anti-friction polyolefin sheet. U.S. Pat. No. 3,924,909 granted to Kent et al. on Dec. 9, 1975 also discloses a liner of low friction material fastened to the tractor bearing plate and an overlying cover plate for protecting the low friction liner during coupling and uncoupling operations. U.S. Pat. No. 4,752,081, granted to Reeners et al. on June 21, 1988, similarly discloses a low friction plastic covering and a pair of elongate metal plates to prevent the plastic covering from being gouged or torn during the trailer coupling and uncoupling procedure.

The above-noted plastic surfaces designed to provide an ever-lasting lubricant have not been widely adopted in the trucking industry. One of the primary drawbacks of such anti-friction sheets is that they are easily scuffed or torn. Although the protective cover plates prevent accumulation of abrasive residue on the sheet surfaces to a certain degree, the surfaces still become fouled with debris, particularly if the tractor is driven for long distances over gravel logging roads and the like with the trailer detached.

If a tractor bearing plate becomes covered with abrasive residue it should preferably be cleaned and relubricated. However, in practice this is often not done as frequently as necessary in order to maintain the fifth wheel assembly in the optimum working condition. When a trailer is coupled to a tractor bearing plate covered with abrasive residue, the abrasive residue will often gouge the trailer bolster plate over time. This eventually results in the need for expensive repairs since a new bolster plate must then be welded to the undersurface of the trailer carriage.

For various reasons, it is becoming increasingly common in the trucking industry for tractors to be driven with the trailer detached (commonly referred to in the trade as "bob-tailing"). Accordingly, the need has arisen for a removable slip cover shaped to conform to a conventional tractor bearing plate for protecting the lubricated surfaces of the bearing plate from abrasive residue when the tractor is driven with the trailer detached.

SUMMARY OF THE INVENTION

In accordance with the invention there is provided a fifth wheel cover for overlying a fifth wheel bearing plate having an arcuate forward end and a pair of opposed rearwardly and downwardly extending ramps remote from the plate forward end. The cover includes a substantially impervious sheet substantially conforming to the shape of the bearing plate, the sheet having an arcuate forward end and a pair of opposed, rearwardly extending sleeves defining a pair of compartments on the undersurface of the sheet for receiving and retaining the ramps. The sheet also includes a skirt extending substantially along the arcuate perimeter of the sheet and depending therefrom which is adapted for releasably fastening the cover to the bearing plate.

Preferably the skirt is tubular and a length of cord is threaded within the skirt which may be fastened at the sheet forward end.

Advantageously the skirt may be elasticized. For example, the cord positioned within the skirt may be elastic. Preferably the skirt sealingly adheres to the fifth wheel bearing plate. Preferably the skirt is constructed from neoprene foam and is less than 2 inches in depth.

BRIEF DESCRIPTION OF THE DRAWINGS

In drawings which illustrate an embodiment of the invention, but which should not be construed as restricting the spirit or scope of the invention in any way.

DETAILED DESCRIPTION OF THE PREFERRED EMBODIMENT

Figure 1:
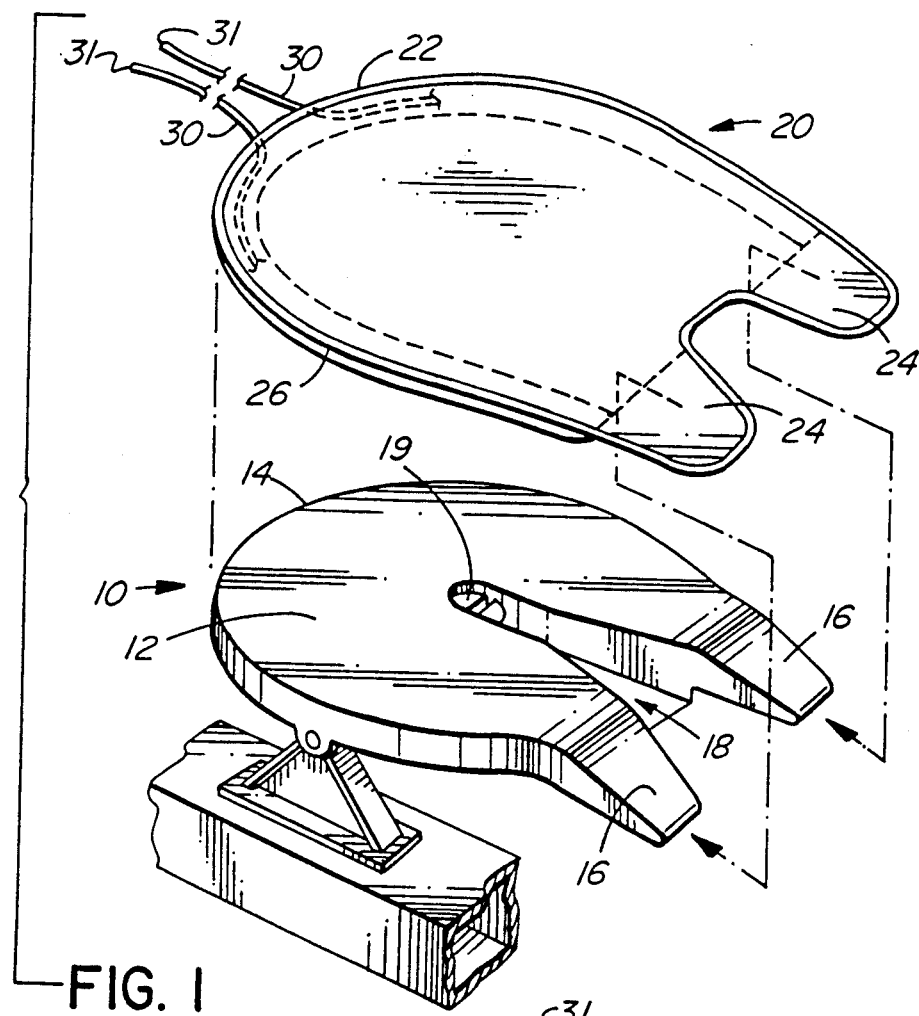
FIG. 1 is an oblique, exploded view of a conventional tractor fifth wheel bearing plate and the slip cover of the present invention for covering the top surface of the bearing plate.

The present invention contemplates the provision of a standard tractor fifth wheel assembly 10 for releasably coupling a tractor to a trailer. Fifth wheel assembly 10 includes a conventional tractor bearing plate 12 having a relatively flat upper surface. Bearing plate 12 has an arcuate forward end 14 and a pair of downwardly and rearwardly extending ramps 16. Ramps 16 define a generally V-shaped forwardly converging tapered guideway 18 extending into the centre of fifth wheel plate 12. Typically, fifth wheel assembly 10 includes a jaw 19 positioned at the apex of guideway 18 for lockably engaging the kingpin of the trailer, and one or more levers for manually opening the jaw (not shown). Fifth wheel assembly 10 is pivotally mounted on the tractor body so that tractor bearing plate 12 may be inclined toward the trailer to facilitate coupling. During and after coupling bearing plate 12 pivots back toward and assumes the horizontal position shown in FIG. 1.

Most trailers have a horizontally disposed bearing plate or bolster plate mounted on the undersurface of the forward portion of the trailer surrounding the trailer kingpin. The trailer bolster plate bears directly against the tractor bearing plate 12 when the trailer is coupled to the tractor as aforesaid. Tractor bearing plate 12 must be suitably lubricated to ensure that the mating surface of the trailer bolster plate rotates relative to fifth wheel assembly 10 when the tractor wheels are turned. If proper lubrication of tractor bearing plate 12 is not maintained, the static friction between tractor bearing plate 12 and the mating trailer bolster plate may increase until the rig becomes "bunk bound" (i.e. the trailer will not rotate relative to the tractor when the rig is steered). In some cases, insufficient fifth wheel lubrication has been shown to be the cause of motor vehicle accidents.

It is becoming increasingly common for tractors to be driven with the trailers detached, which is commonly referred to in the trucking industry as "bob-tailing". For example, in some commercial operations, it is preferable to assemble a number of cargo-containing trailers destined for different locations in a central staging area. A fleet of tractors is provided for hauling the trailers. In operation, one of the tractors is dispatched to haul a particular trailer to its assigned destination. The trailer is uncoupled from the trailer at its destination and the tractor then returns to the central staging area with its fifth wheel bearing plate 12 exposed to abrasive road debris.

Another growing trend in the trucking industry is for a single tractor to haul two or more linked trailers, sometimes referred to as "B-trains". As a result of unequal weight distribution, it is often necessary to detach the trailers one from the other before the rig negotiates steep inclines or sharp corners, especially in icy conditions. Typically, the truck driver detaches one of the trailers from the rig at the bottom of the incline to be negotiated and hauls one of the trailers to a pull out located at the top of the incline. The truck driver then detaches the first trailer from the tractor fifth wheel assembly 10 and returns to the bottom of the incline with the tractor fifth wheel bearing plate 12 exposed to abrasive road debris and the like. The second trailer is then coupled to the tractor and hauled up the incline to the pull-out area. The trailers are then reconnected together and the B-train proceeds to the next major incline where the above-described procedure is repeated.

One problem which has arisen is that the tractor bearing plate 12 tends to become covered with abrasive debris when the tractor is driven with the trailer detached. This is particularly the case where the tractor is driven over gravel logging roads and the like. Another problem which has arisen is that the lubricating grease typically applied to fifth wheel bearing plate 12 tends to lose its viscosity over time if it is repeatedly exposed to rain and snow. If proper precautions are not taken to clean fifth wheel bearing plate 12 and reapply lubricating grease periodically, then the static friction between bearing plate 12 and the mating trailer bolster plate may increase to dangerous levels.

There is also a tendency for debris adhering to tractor bearing plate 12 to gouge or tear the trailer bolster plate after the trailer has been coupled to the tractor as aforesaid. Motor vehicle regulations require that trailer bolster plates must be replaced completely if they become gouged to an unacceptable level. Routine inspections of trailer bolster plates confirm that this is a very prevalent problem. The cost of welding a replacement bolster plate on a trailer is typically on the order of several hundred dollars.

Figure 2:
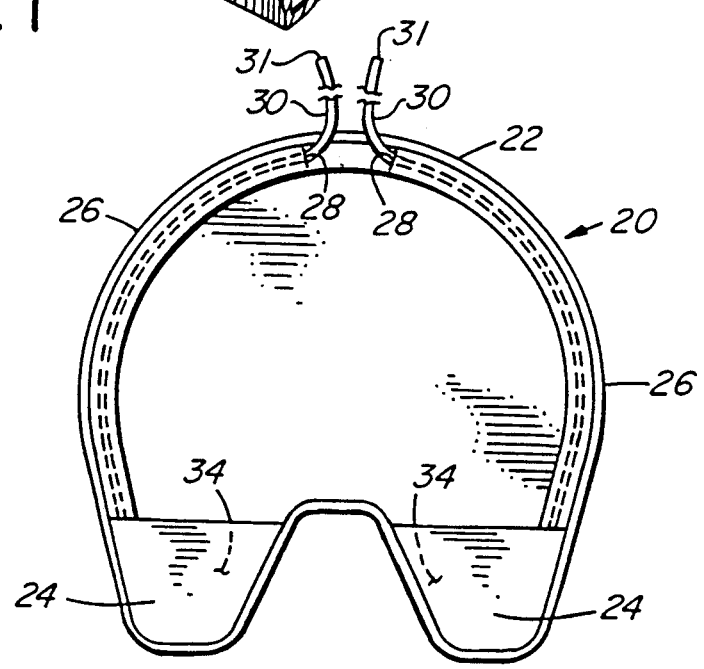
FIG. 2 is a bottom, plan view of the slip cover of FIG. 1.

Accordingly, the applicant has devised a fifth wheel slip cover generally designated 20 for covering tractor bearing plate 12 when the tractor is driven with the trailer detached. With reference to FIG. 1, slip cover 20 is constructed to conform to the outline of tractor bearing plate 12 and includes an arcuate forward end 22 and a pair of opposed, rearwardly extending sleeves 24. As shown in FIG. 2, sleeves 24 define a pair of inner compartments 34 for receiving ramps 16 of standard fifth wheel assembly 10.

As shown best in FIG. 2, slip cover 20 also includes a tubular skirt 26 extending along the arcuate perimeter of cover 20. Skirt 26 has a pair of open mouths 28 located at sleeve forward end 22. An elastic drawcord 30 is preferably threaded through skirt 26 so that its free ends 31 extend from skirt open mouths 28. In an alternative embodiment, drawcord 30 may be pre-stretched and sealed within skirt 26 so that skirt 26 is effectively elasticized. In this embodiment mouths 28 are sealed.

Slip cover 20 is constructed from a resilient, durable material, such as impregnated NYLON TM, which is impervious to the industrial grease normally used to lubricate tractor fifth wheel bearing plates 12. Skirt 26 is preferably constructed from foam neoprene so that skirt 26 will sealingly adhere to the peripheral edges of tractor bearing plate 12.

In operation, slip cover 20 is installed overlying tractor fifth wheel bearing plate 12 whenever the tractor is driven with the trailer detached. To install cover 20, the tractor driver stands astride the front end of fifth wheel assembly 10 and casts cover 20 rearwardly. Cover 20 is then pulled forwardly so that bearing plate ramps 16 are fitted into rearwardly extending cover sleeve compartments 34. The tractor driver continues to pull cover 20 forwardly until cover 20 is stretched over the entire top surface of bearing plate 12. Cover end 22 is then secured around the corresponding arcuate forward end 14 of bearing plate 12 so that tubular skirt 26 sealingly engages the peripheral rim of bearing plate 12. Preferably, skirt 26 is approximately 1-2 inches in depth so that it does not interfere with jaw release levers typically extending laterally from fifth wheel assembly 10 several inches below the top surface of bearing plate 12.

Finally, the truck driver fastens drawcord free ends 31 together at the front of the fifth wheel assembly 10. Cover 20 is thus releasably secured to tractor bearing plate 12.

In the alternative embodiment described above wherein drawcord 30 is sealed with elastic skirt 26, the cover forward end 22 is simply fitted over the corresponding bearing plate forward end 14 and snapped into place.

Slip cover 20 may be easily removed from bearing plate 12 by unfastening drawcord free ends 31 and reversing the above-described procedure.

As should be apparent to someone skilled in the art, slip cover 20 may be dimensioned to conform to bearing plates 12 of different sizes. For example, standard tractor fifth wheel bearing plates 12 are approximately 34 inches in diameter. Fifth wheel assemblies used on recreational vehicles and the like have the same basic shape as described above but are significantly smaller in size. Accordingly, fifth wheel covers 20 of relatively smaller size would be required to overlie the bearing plates 12 of such vehicles.

The applicant perceives that cover 20 could be marketed as a promotional item by imprinting corporate logos and advertising slogans on its outwardly visible top surface as is commonly done with slip covers for spare tires.

As will be apparent to those skilled in the art in the light of the foregoing disclosure, many alterations and modifications are possible in the practice of this invention without departing from the spirit or scope thereof.

Accordingly, the scope of the invention is to be construed in accordance with the substance defined by the following claims.

What is claimed is:

1. A fifth wheel cover for overlying a fifth wheel bearing plate having an arcuate forward end and a pair of opposed rearwardly and downwardly extending ramps remote from said forward end, said cover comprising:
    (a) a substantially impervious sheet substantially conforming to the shape of said bearing plate, said sheet having an arcuate forward end and a pair of opposed, rearwardly extending sleeves defining a pair of compartments on an undersurface of said sheet for receiving and retaining said ramps; and
    (b) a skirt extending substantially along an arcuate perimeter of said sheet and depending therefrom, said skirt being adapted for releasably fastening said cover to said bearing plate.

2. A fifth wheel cover as defined in claim 1, where said skirt is tubular and wherein a length of cord is threaded within said skirt.

3. A fifth wheel cover as defined in claim 2, wherein said cord is fastenable at said sheet forward end.

4. A fifth wheel cover as defined in claim 1, wherein said skirt is elasticized.

5. A fifth wheel cover as defined in claim 2, wherein said cord is elastic.

6. A fifth wheel cover as defined in claim 1, wherein said skirt is less than 2 inches in depth.

7. A fifth wheel cover as defined in claim 1, wherein said skirt sealingly adheres to said fifth wheel bearing plate.

8. A fifth wheel cover as defined in claim 7, wherein said skirt is constructed from neoprene foam.

* * * * *